May 29, 1956  C. A. DILLINGER  2,747,707
POWER TRANSMISSION CONTROL SYSTEM
Filed Jan. 19, 1953  2 Sheets-Sheet 1
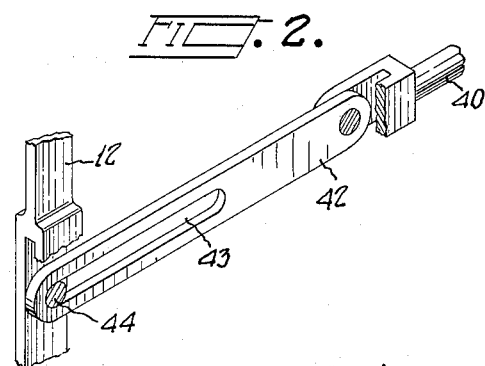
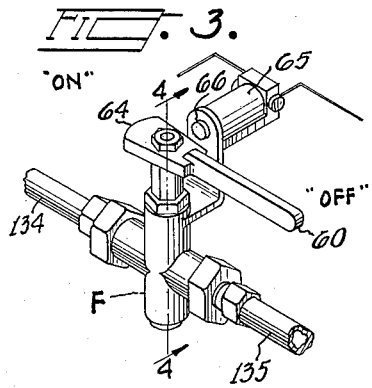
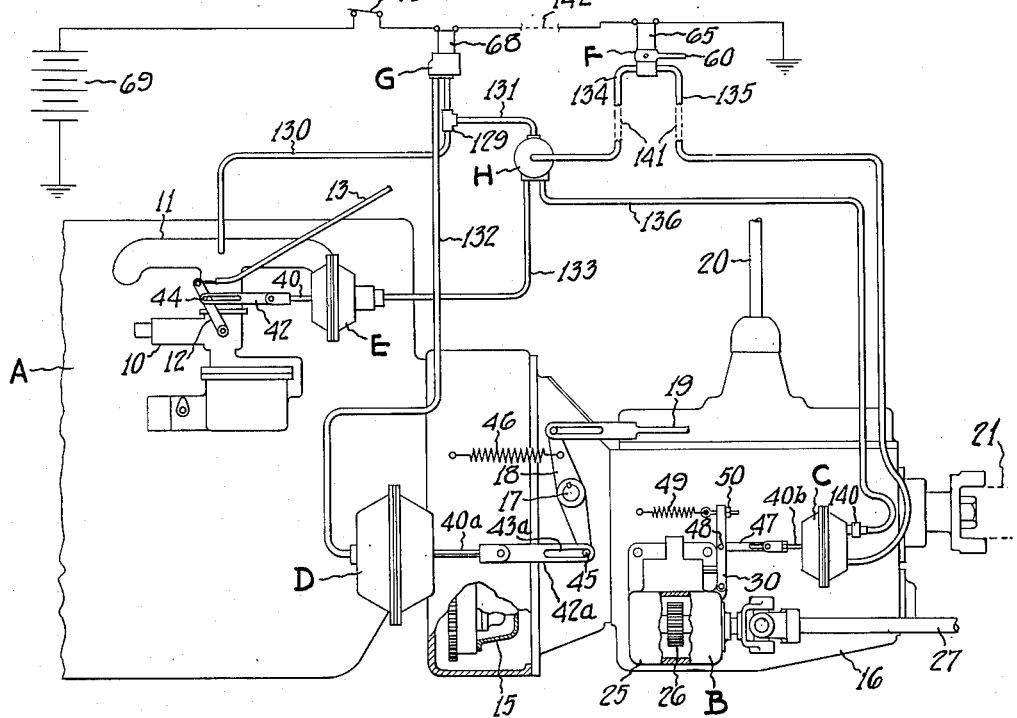
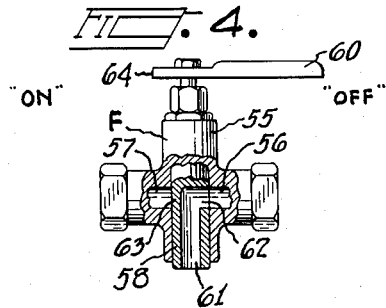
INVENTOR
CHESTER A. DILLINGER
BY Cook and Schermerhorn
ATTORNEYS May 29, 1956 C. A. DILLINGER 2,747,707
POWER TRANSMISSION CONTROL SYSTEM
Filed Jan. 19, 1953 2 Sheets-Sheet 2
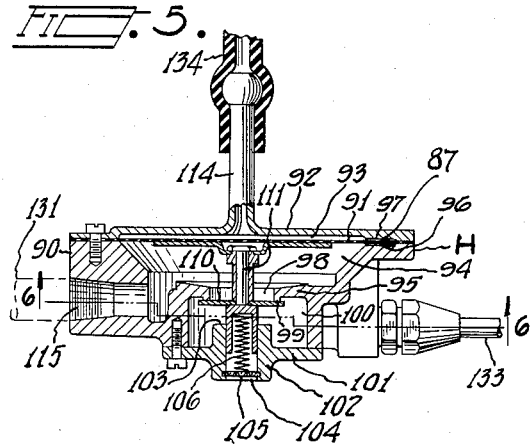
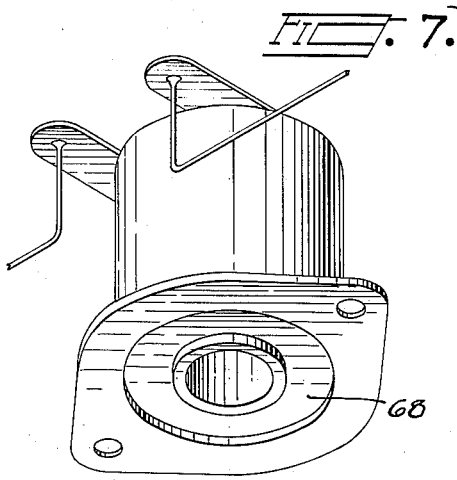
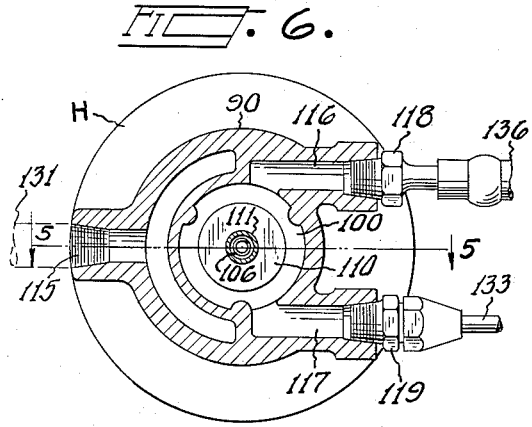
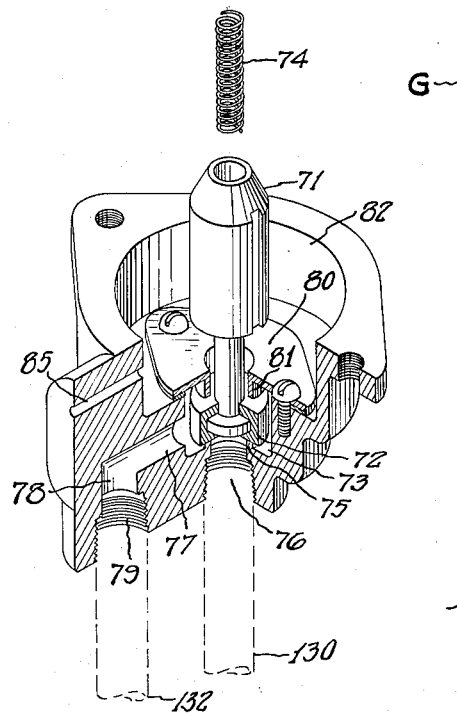
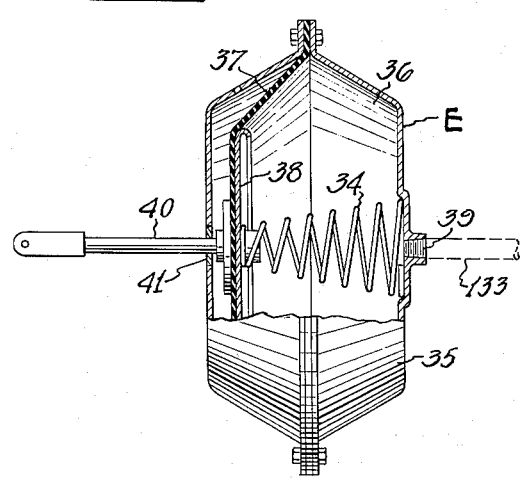
INVENTOR
CHESTER A. DILLINGER
BY
Cook and Schermerhorn
ATTORNEYS United States Patent Office 2,747,707
Patented May 29, 1956

2,747,707

POWER TRANSMISSION CONTROL SYSTEM

Chester A. Dillinger, Portland, Oreg.

Application January 19, 1953, Serial No. 331,887

13 Claims. (Cl. 192—.092)

This invention relates to a control system for a power transmission, and has particular reference to a remote control system for a power take-off on a vehicle internal combustion engine.

It is often desirable to control a power transmission such as a gear box at some remote point, as, for instance, at a station where the power is being utilized to perform some useful function. A fuel oil delivery truck is an example of such a situation. It is customary to pump the oil out of the truck tank through a hose by means of a pump driven from a so-called power take-off on the main transmission of the truck engine. The oil delivery hose is ordinarily connected at the rear end of the truck, thereby requiring the delivery pump for the hose to be driven by a long shaft leading up to the truck transmission.

In order to operate such a pump, it is necessary, in conventional practice, for the operator to manipulate the auxiliary gear shift lever for the power take-off and the clutch pedal used in driving the vehicle from the driver's seat in the cab of the truck. In starting the delivery pump, after putting the hose in position, it is necessary to disengage the clutch, engage the power take-off gear, re-engage the clutch, and advance the engine throttle from idling speed to a position which will produce the desired pump speed. When the fuel delivery has been completed, the operator must return to the cab to stop the pump before putting away the hose and closing the rear compartment of the truck. The operator is thereby inconvenienced, and wastes considerable time at each oil delivery stop, by having to walk back and forth between the cab and rear end of the truck, and climb into the cab, to perform these functions.

It is, accordingly, the general object of the present invention to provide an improved control system for operating an internal combustion engine and transmission from a remote station convenient to the operator. A particular object is to provide remote control means for the clutch, power take-off auxiliary gear shift and engine throttle of a motor vehicle operable from some station outside the vehicle where the power take-off is being utilized for a useful purpose. Another object is to provide a remote control mechanism for operating the throttle, clutch and auxiliary gear shift of a power take-off on an internal combustion engine by electrical and pneumatic means which may be controlled from a remote station through flexible conduits and wires without the mechanical limitations imposed by elongated rod and lever mechanical operating means.

Another object is to provide a control system for operating the clutch, power take-off gear shift and throttle lever of an internal combustion engine in proper sequence and in timed relation to effect the starting and stopping of some device operated by the power take-off, by the simple movement of a single control handle.

In the present system, the engine clutch and the gear shift for the power take-off are operated by vacuum motor units connected with the intake manifold or vacuum pump on the engine. Another vacuum motor unit is employed to open the throttle to an appropriate position for the device which is to be driven by the power take-off. These various vacuum units are mounted conveniently on the engine and transmission and are controlled by pneumatic and solenoid operated valves through flexible conduits and wires leading to the most convenient position for an operator's station. The form and arrangement of the valves in the system further provide for the sequence and timing of certain functions required in a gear shifting operation. Thus, by the operation of a single manipulable lever at the rear of the truck where the delivery pump and hose are located, the clutch is disengaged quickly, the power take-off gears are meshed slowly, the clutch is reengaged slowly, and the throttle is advanced to a predetermined setting without the operator giving conscious attention to these various operations at the front of the truck which are incidental but requisite to his main purpose of effecting the delivery of oil from his delivery hose at the rear of the truck.

Additional objects and advantages will become apparent and the invention will be better understood with reference to the accompanying drawings illustrating a preferred embodiment. It is to be understood, however, that the drawings are for the purpose of illustrating the invention and are not intended to limit the invention, the same being defined by the appended claims. Various changes may be made in the arrangement of the system and in the form of its specific components, and certain features may be used without others, within the scope of the claims.

In the drawings:

Figure 1 is a schematic general view of the control system;

Figure 2 is a fragmentary perspective view of a lost motion connection between certain parts illustrated in Figure 1;

Figure 3 is a perspective view of the manual control valve and switch shown in Figure 1;

Figure 4 is an elevation view, with parts broken away, of the valve shown in Figure 3;

Figure 5 is a sectional view of a pneumatically operated valve shown in Figure 1, taken on the line 5—5 of Figure 6;

Figure 6 is a cross sectional view taken on the line 6—6 of Figure 5;

Figure 7 is an exploded view of the solenoid operated valve shown in Figure 1; and Figure 8 is an elevation view of one of the vacuum motor units shown in Figure 1, with parts broken away and in section.

Referring first to Figure 1, the principal components of the present system are indicated by leters of the alphabet and the minor features are designated by reference numerals. In the present illustrative embodiment of the invention, the system is installed in a motor vehicle such as an oil tank truck having an engine A intended primarily for propelling the vehicle and also used to drive some auxiliary instrumentality such as a delivery pump for delivering the oil through a hose to customers' tanks. The delivery pump (not shown) is driven when the occasion demands through a power take-off B on the transmission housing of the engine A. The power take-off is operatively engaged and disengaged from the engine transmission by means of a vacuum operated diaphragm type motor unit C. During such engaging and disengaging operations, the vehicle clutch must be momentarily disengaged and then reengaged, and this function is performed by a second vacuum operated motor unit D.

Concurrently with the foregoing operations, the throttle is advanced from idling position to a suitable operating position for the device driven by the power take-off by means of a third vacuum operated motor unit E. The sub-atmospheric air pressure, or vacuum for operating the motor devices C, D and E, is obtained from the engine manifold or a suitable vacuum pump.

A feature of the invention, as pointed out in the above stated objects, resides in the provision of a single manual control valve F for operating the three pneumatic motor devices in the proper sequence and relationship to engage and disengage the power take-off and properly adjust the speed of the engine by a simple manipulation of the valve lever. The control system further includes a solenoid operated valve G and a pneumatically operated valve H which are connected by flexible conduits and wires with the other components enumerated. The system will hereinafter be described in greater detail with specific reference to a conventional type of motor vehicle engine. Such engines and vehicles are well known and understood by persons skilled in the art, and so only those parts of the engine which are directly associated with the present system are illustrated on the drawings.

The engine A is equipped with a carburetor 10 connected with an intake manifold 11. The carburetor has a throttle valve lever 12, normally controlled in the driving of the vehicle by the usual throttle rod 13. The engine also has the usual clutch 15 and sliding gear transmission contained within the transmission housing 16. The clutch is engaged and released by the rotative movement of a stub shaft 17, normally actuated by a lever 18 and rod 19 connected with the clutch pedal in the driver's compartment. The transmission has the usual gear shift lever 20 for changing the driving ratios between the engine and the main drive shaft 21 leading to the rear wheels of the vehicle.

The power take-off B comprises a small gear housing 25 attached to the transmission housing 16 and containing a sliding gear 26 which may be engaged with a gear of the main transmission for driving the power take-off shaft 27. The device which is driven by the power take-off shaft 27 may be mounted at a considerable distance from the transmission 16, as in the case of the present fuel delivery pump (not shown) which is ordinarily mounted at the rear end of the vehicle. The gear 26 is engaged and disengaged with respect to the said transmission gear by means of a lever 30 which has heretofore been actuated by an auxiliary gear shift lever in the cab of the truck alongside the main gear shift lever 20. In accordance with the principles of the invention, the throttle lever 12, clutch lever 18, and power take-off shift lever 30 are arranged to be actuated by vacuum motor units for controlling the operation of the power take-off shaft 27 without interfering with the normal operation and driving of the vehicle by the usual throttle control, clutch pedal and main transmission gear shift.

The internal construction of the vacuum motor unit E is shown in Figure 8. The housing 35 defines a chamber 36 on one side of a flexible diaphragm 37 which includes a large rigid disc 38. Communication is established with chamber 36 by means of a pipe or hose connection 39, the other side of the diaphragm being exposed to atmospheric pressure. Disc 38 is fixedly mounted on a rod 40 which has longitudinal reciprocating movement in a guide 41. Spring 34 holds the parts normally in the extended position shown, but, when a vacuum or subatmospheric pressure is established in the chamber 36 on the right side of diaphragm 37, the atmospheric pressure on the left side of the diaphragm overcomes the thrust of spring 34 and moves the diaphragm and rod 40 to the right.

Referring back to Figure 1 and making further reference to Figure 2, the rod 40 is connected with a lost motion link 42 having a longitudinal slot 43 to receive a pin 44 in the throttle valve lever 12. The lever 12 is shown in idling position in Figure 1 at the left-hand or counterclockwise limit of its movement. When the vehicle is being driven, the throttle is opened by the movement of throttle rod 13 to the right, thereby sliding pin 44 to the right in slot 43 without encountering resistance from spring 34 in the unit E. When the rod 40 and link 42 are moved to the right by diaphragm 37 in response to a vacuum condition in the unit E, the left end of slot 43 engages pin 44 to move throttle valve lever 12 to the right in clockwise rotation, carrying the throttle rod 13 with it through the relatively short range of movement ordinarily required to operate the device driven by the power take-off shaft 27.

The vacuum motor unit D in Figure 1 is similar to the unit E just described, except that it is mounted in reverse direction on the engine to reverse the direction of movement of its rod 40a and lost motion link 42a. A pin 45 in the lower end of lever 18 normally rests in the outer end of slot 43a by the action of clutch pedal spring 46. When the clutch pedal is depressed manually, pin 45 travels to the left in slot 43a without encountering resistance by the extended position of rod 40a and link 42a, but when rod 40a and link 42a are retracted to the left by unit D, the lever 18 is rotated clockwise to disengage the clutch 15 for the purpose of shifting the power take-off gear 26.

The vacuum unit C is similar to the units D and E except that connections are provided in the housing for two vacuum conduits. Rod 40b is connected with a link 47 which is pivotally connected at 48 with the lever 30. The upper end of lever 30 is tensioned to the left by a spring 49 having a tension adjustment at 50 which may be tightened to insure disengagement of the power take-off gear 26 and to impose sufficient pre-loading on the diaphragm of the vacuum unit to cause a delayed and slow engaging motion when the pressure is reduced in chamber 36 of the unit C. Thus the power take-off is disconnected by movement of the mentioned parts to the left by spring 49 and is engaged by movement of the parts to the right by the vacuum unit.

The internal construction of manual control valve F is shown in Figure 4. The valve body 55 has a passage 56 for connection with one conduit and an aligned passage 57 for connection with another conduit. The valve body contains a rotatable plug 58 adapted to be turned through 180° by handle 60. The plug contains a passage 61 having its lower end open to atmosphere and its upper end communicating with a port 62 which may be turned selectively into communication with either one of the passages 56 and 57. The passage 56 or 57 which is not in communication with the port 62 is closed by a cylindrical wall surface 63 on the plug.

The valve handle 60 is equipped with a cam surface 64 for operating a switch 65 (Figure 3) when the handle is turned. When the valve handle is rotated through 180° in a clockwise direction from its position shown in Figure 3, the cam surface 64 engages an actuating plunger 66 for the switch 65 to close the switch momentarily and then reopen it while the handle is being turned. Thus the valve handle has two limit or rest positions in 180° relationship, in both of which positions the switch 65 is open, the switch merely being closed momentarily each time the handle 60 passes through an intermediate position in its movement from one limit position to the other. Switch 65 controls the energization of the coil 68 of solenoid valve G, the switch and solenoid coil being connected in series circuit with the vehicle battery 69 and ignition switch 70 in Figure 1, or other suitable control switch.

The internal construction of solenoid valve G is shown in Figure 7. The valve G contains a plunger type armature 71 for shifting a cylindrical valve member 72 in a vertical direction in a valve chamber 73. Spring 74 acts against the plunger 71 to hold the valve member 72 normally seated against the circular rim or port 75 of a central passage 76 which is threaded for connection with a conduit. The side wall of chamber 73 contains a port 77 which is not engaged by the valve member 72. Port 77 communicates with a passage 78 having an external conduit connection 79. The upper side of chamber 73 is closed by a wall 80 having a circular downwardly projecting rim forming a valve seat and port 81. This port is engaged and closed by the valve member 72 when the solenoid is energized, drawing the plunger 71 upward and compressing the spring 74. Above the wall 80 there is a second chamber 82 having its upper side closed by the solenoid coil 68 and its casing. This chamber communicates with atmosphere at all times through a restricted inlet orifice 85. It will also be appreciated that the passage 78 communicates with the valve chamber 73 at all times, the chamber 73 being in communication with chamber 82 and orifice 85 when the solenoid is deenergized, but placed in communication with passage 76 when the solenoid is energized.

The construction of pneumatically operated valve H is shown in Figures 5 and 6. The valve body 90 contains a diaphragm 91 clamped to the body by a cover plate 92 which is slightly spaced from the diaphragm to define an upper chamber 93. A middle chamber 94 is defined on its upper side by the diaphragm 91 and on its lower side by an intermediate wall 95. Small grooves 96 and 97 in the body 90 and cover plate 92 form a restricted bleed passage through an aperture 87 near the edge of the diaphragm 91 to relieve a pressure differential on opposite sides of the diaphragm under a certain condition of operation which will presently be explained. Intermediate wall 95 has a central port 98 with a downwardly facing rim forming a valve seat 99.

A lower chamber 100 has its upper side defined by intermediate wall 95 and its lower side defined by a bottom wall 101. Wall 101 is traversed by a tubular wall portion 102 having a circular valve seat 103 on its upper end of less diameter than the valve seat 99. The lower end of cylindrical wall portion 102 forms a port 104 open to atmosphere at all times and equipped with a screen 105 and adapted to seat the lower end of a coil spring 106. A valve disc 110 is carried by a stem 111 having its upper end abutting the lower side of diaphragm 91 and having its lower end seated on the upper end of spring 106. Valve disc 110 rests against the seat or port 99 in its upper limit position shown, but moves down to rest against seat or port 103 when the fluid pressure in chamber 94 is reduced sufficiently in relation to the pressure existing in chamber 93, the area of port 103 being considerably less than the area of diaphragm 91. Cover plate 92 is equipped with a conduit connection 114 communicating with chamber 93. A conduit connection 115 communicates with the middle chamber 94. Passages 116 and 117, equipped with conduit connections 118 and 119, communicate with the bottom chamber 100 as shown in Figure 6.

The source of vacuum for the entire system comprises a pipe 130 connected at one end to the intake manifold 11. The other end of this pipe connects with the passage 76 of solenoid valve G as shown in Figure 7. A T-connection 129 in the pipe 130 establishes constant communication with the source of vacuum through pipe 131 to the passage 115 and middle chamber 94 of the pneumatically controlled valve H, as shown in Figures 5 and 6. A flexible hose connection 132 connects passage 78 in solenoid valve G with the vacuum motor unit D for operating the clutch. A relatively small pipe 133 connects the vacuum motor unit E for the throttle with passage 117 in the pneumatically operated valve H as shown in Figure 6. The small size of this conduit offers sufficient resistance to the gas flow to retard the diaphragm movement and impart a slow action to the throttle adjustment.

A flexible hose 134 extends from the hose connection 114 on valve H (Figure 5) to the passage 57 in the manual control valve F. The passage 56 in manual control valve F communicates with flexible hose 135 leading to the vacuum motor unit C for the power take-off. Another flexible hose 136 leads from the passage 116 and connection 118 of the pneumatically operated valve H to the vacuum motor unit C, it being understood that both conduits 135 and 136 communicate with the same chamber 36 with reference to the similar unit E in Figure 8. The numeral 140 designates a check valve which allows air to flow from the unit C through the hose 136 to the valve H, but prevents reverse flow. The purpose of this check valve will presently be described.

The breaks 141 in hose lines 134 and 135, and the break 142 in the circuit wire connection, indicate the remote position of manual control valve F at a convenient station which may be at some distance from the other components in Figure 1. All the components of the control system except the manual valve F are associated with the engine and transmission of the vehicle at the front end thereof. The flexible hoses 134 and 135 and the circuit wires for switch 65 permit the valve F to be located in the most convenient position, which, for many purposes such as the particular type of installation hereinabove mentioned, would be at the extreme rear end of the vehicle. The various control functions applied to the engine and transmission by the remotely located manual control valve F will now be described.

*Operation*

When the engine is idling preparatory to the functioning of the delivery pump or other device to be operated by the power take-off, the various parts assume the rest positions illustrated in the drawings. Manual control valve F is in what may be referred to as its "off" position, establishing atmospheric pressure in hose 135 and the closed chamber 36 behind the diaphragm in vacuum unit C. Springs 34 and 49 then hold power take-off shift lever 30 to the left in Figure 1, keeping the gear 26 disengaged so that power take-off shaft 27 remains stationary. Hose line 136 likewise communicates with atmospheric pressure through chamber 100 and port 104 of the valve H, since valve disc 110 is pressed against its upper seat 99 by the action of spring 106.

The off position of manual control valve F closes the end of hose line 134 connected with this valve. The middle chamber 94 of pneumatic valve H is always connected with vacuum through pipes 131 and 130, but when the end of hose 134 is closed by valve F the air in hose 134 and chamber 93 is drawn out through bleed passages 96, 97 so that as soon as the system is stabilized the same sub-atmospheric or vacuum pressure condition exists in chambers 93 and 94 on opposite sides of diaphragm 91. This explains the previously mentioned condition of valve disc 110 being seated against its upper valve seat 99 by the action of spring 106, notwithstanding the fact that middle chamber 94 is always connected to engine vacuum. Hose line 133, like hose 136, is thus in communication with atmospheric pressure through chamber 100 of valve H and port 104, whereby the rod 40 and link 42 are extended to their left-hand limit positions by the action of spring 34 in the vacuum unit E, allowing throttle lever 12 to remain in its left-hand or idle position.

Solenoid G is deenergized at this time, even though switch 70 be closed, by reason of the normally open switch 65. Spring 74 in solenoid valve G accordingly depresses plunger 71, seating valve member 72 against its lower seat 75. The hose connection 132, therefore, communicates with atmospheric pressure through passage 78, chamber 73, port 81, chamber 82, and restricted orifice 85. Thus, atmospheric pressure in the chamber 36 of vacuum unit D allows springs 34 and 46 to thrust rod 40a and link 43a to its right-hand limit position in Figure 1, so that the clutch lever 18 and clutch 15 remain in engaged position.

When the delivery pump or other device to be operated by power take-off shaft 27 is to be set in motion, the operator turns the handle 60 of manual control valve F in clockwise rotation from its "off" position shown in Figures 3 and 4. In the initial movement of the handle, passage 57 remains closed by a portion of the surface 63 of the plug 58, and another portion of this surface then closes the passage 56 which has no effect on the system. As the handle 60 approaches a quarter turn of movement, cam surface 64 depresses switch plunger 66, closing switch 65 and energizing solenoid winding 68 of the solenoid valve G. This solenoid is sufficiently powerful to lift its armature plunger 71 against the force of spring 74 and the subatmospheric pressure condition in pipe 130 to raise valve member 72 from its bottom seat 75 and seat it against its upper seat 81. The sub-atmospheric or "vacuum" pressure condition of pipe 130 is thereby communicated through chamber 73 and passage 78 to hose line 132 and the chamber 36 behind the diaphragm of vacuum unit D, causing immediate and rapid disengagement of the clutch 15.

As the manual control valve handle 60 moves from its quarter turn position toward its "on" position, cam segment 64 leaves its engatement with switch plunger 66, allowing the switch 65 to return to its normally open position to deenergize the coil 68 of solenoid valve G. Upon deenergization of the solenoid, spring 74 immediately returns valve member 72 to its lower seat 75, closing the end of vacuum line 130 and reestablishing communication with atmospheric pressure to hose 132 through passage 78, chamber 73, port 81, chamber 82 and restricted orifice 85. The resistance to air flow imposed by restricted orifice 85 and the resistance of clutch spring 46 relay the return movement to the right of the diaphragm and rod 40a in vacuum unit D, so that the reengagement of clutch 15 is sufficiently delayed to allow time for the shifting of the power take-off gear 26.

When the manual control valve handle 60 approaches its "on" position after 180° of clockwise rotation from its "off" position shown in Figure 3, port 62 of the rotatable plug 58 places passage 57 in communication with atmosphere and cylindrical surface 63 closes the passage 56. The passages and ports 61, 62 and 57, in manual control valve F, are large in relation to the bleed passages 96 and 97 around the edge of diaphragm 91 in the valve H, and so substantially atmospheric pressure is established in the upper chamber 93. Also, the conduits 130 and 131 are large in relation to bleed passages 96 and 97 so that substantially the sub-atmospheric pressure of the engine manifold is maintained in the middle chamber 94, the bleed passages 96 and 97 being ineffective under this operating condition to equalize the pressure differential in chambers 93 and 94. The area of diaphragm 91 is sufficient under this condition to cause the pressure in upper chamber 93 to depress the diaphragm and stem 11 against the force of spring 106 and move valve disc 110 down against its bottom seat 103, thereby closing chamber 100 to atmosphere and establishing the reduced manifold pressure therein. The reduced pressure chamber 100 is communicated through hose 136 and pipe 133 to the chambers 36 of vacuum units C and E.

As hereinabove stated, pipe 133 is preferably of relatively small diameter so that the atmospheric pressure in vacuum unit E is reduced slowly, causing the diaphragm and throttle to respond slowly. As the air is exhausted from chamber 36 behind the diaphragm of vacuum unit E, the throttle is opened gradually a sufficient amount to operate the engine at the desired speed for its intended purpose.

At the same time, the withdrawal of air from vacuum unit C causes rod 40b and link 47 to move, shifting lever 30 to the right, moving gear 26 into driven engagement with an element of the transmission. The power take-off shaft 27 thereupon starts to rotate at a speed determined by the now partially open throttle position which has just been established by the vacuum unit E.

A slow engaging movement of the unit C is insured by reason of the relatively large volume of air which must be removed from unit C, hose 136 and the long hose 135, preventing the pressure in unit C from falling abruptly as soon as chamber 100 is connected with the source of vacuum. If gear 26 does not mesh properly, the slow engagement of the clutch will start the transmission gears to rotate slowly before the engine is accelerated appreciably by unit E, thereby facilitating the meshing before units C and D exert their full engaging forces.

When it is desired to stop the operation of power take-off shaft 27, the manual control valve hand lever 60 is turned backed in counterclockwise rotation to its "off" position shown in Figure 3. As the hand lever passes the mid point in this movement, switch 65 is again closed to energize solenoid valve G momentarily to reduce the pressure in vacuum unit D to a sub-atmospheric value effecting the disengagement of clutch 15. This movement occurs quickly.

When handle 60 reaches the limit of its movement toward its "off" position, the valve F again closes the passage 57 to hose 134, and also reestablishes atmospheric communication through port 62 and hose 135 to vacuum unit C which disengages the power take-off gear 26. The disengaging movement of unit C is faster than its engaging movement by reason of the adjustment of spring 49, so that the combined action of springs 34 and 49 will start to move the diaphragm upon a relatively small increase in pressure in unit C. Also, in this disengaging phase of operation air is admitted to both hoses 135 and 136 to fill the unit C quickly, whereas in the disengaging phase the air in hoses 135 and 136 and unit C is all removed through hose 136 and passage 116 in the valve H.

The closing of hose 134 to atmosphere at the valve F causes the air pressure in top chamber 93 of pneumatic valve H to come into equilibrium with the sub-atmospheric pressure in middle chamber 94, allowing spring 106 to raise the valve disc 110 from its lower seat 103 back to its upper seat 99, thereby reopening the bottom chamber 100 to atmospheric pressure through port 104. Atmospheric pressure in chamber 100 is communicated to hose connection 136 and pipe 133, the latter admitting atmospheric pressure to the vacuum unit E, allowing spring 34 to move rod 40 and link 42 to the left to return throttle lever 12 to its idling position. By the time these movements have taken place, the restricted orifice 85 in deenergized solenoid valve G has admitted enough air through chamber 82, port 81, chamber 73, passage 78, and hose 132 to the vacuum unit D to allow the spring 34 in this device and spring 46 to reengage the clutch 15, which is its normal rest position.

Check valve 140 does not function in the normal operation of the system, but provides a desirable safeguard in case of stalling of the engine during operation of the power take-off. Without this check valve, it will be apparent that upon stalling of the engine the failure of the vacuum in pipes 130 and 131 would allow spring 106 in the pneumatic valve H to return the valve disc 110 to its upper seat 99, thereby admitting atmospheric pressure through port 104 and chamber 100 to pipe 133 and hose connection 136, the latter then admitting atmospheric pressure to vacuum unit C to disengage the power take-off gear 26. In such event, the admission of atmospheric pressure to pipe 133 is desirable, because this will return the throttle to idle position, but the disengagement of the power take-off is undesirable, because when the engine is restarted the reestablishment of sub-atmospheric pressure in pipe 136 would actuate the diaphragm in vacuum unit C to reengage the power take-off gear 26 without any disengagement of the clutch 15, resulting in damage to the gears. The likelihood of damage would be increased by the immediate reduction of pressure in pipe 133, tending to accelerate the engine at the same time.

Check valve 140 prevents the introduction of atmospheric pressure through hose 136 to vacuum unit C and thereby holds the power take-off gear 26 engaged in the event of engine failure. Hose 135 is closed to atmosphere by the plug surface 63 in valve F at such time. Ordinarily, the load on the power take-off shaft 27 is not sufficient to interfere with restarting of the engine, and, in any event, the starting of the engine under a light load is less objectionable than the damage which would be certain to result to the power take-off and transmission gears by their reengagement while the clutch remained engaged.

Thus, the present system provides a single control handle for the remote control of throttle, clutch and auxiliary power take-off gear shift for starting and stopping the device driven by the take-off without requiring the operator to go to the driver's seat to manipulate the various controls individually. The present system does not interfere with the usual operation of the vehicle and does not have to be adjusted or disconnected for driving the vehicle from one delivery point to another. Also, the system is readily adaptable to diesel and other types of engines which do not employ a carburetor as illustrated.

Having now described my invention and in what manner the same may be used, what I claim as new and desire to protect by Letters Patent is:

1. A power transmission including a clutch and a power take-off shaft adapted for connection with said transmission to be driven thereby, a control handle having movement between two limit positions, fluid pressure actuated means and valve means controlled by said handle for connecting said shaft with the transmission in one limit position and disconnecting said shaft from the transmission in the other limit position of said handle, fluid pressure actuated means and valve means controlled by said handle in an intermediate position for disengaging said clutch in both directions of movement of said handle, and means including said last fluid pressure actuated means for controlling the rate of reengagement of said clutch.

2. A power transmission control system comprising a transmission shifting unit, a clutch operating unit, and a throttle adjusting unit, a manual control member movable between two positions, means controlled by said member in one of said positions for operating said shifting unit to engage a driven member with the transmission, means controlled by said member in the other of said positions for operating said shifting unit to disengage said driven member from the transmission, means controlled by said member in said two positions to actuate said throttle adjusting unit toward open and closed throttle positions, respectively, and means controlled by said member in an intermediate position for actuating said clutch unit.

3. In a vehicle having an internal combustion engine with a throttle, clutch and transmission normally used for driving the vehicle, a power take-off on said transmission, auxiliary units for connecting said power take-off with the transmission and disconnecting said power take-off from the transmission, operating said clutch and adjusting said throttle, a movable remote control member at a distance from the engine and driver's seat of the vehicle, control means connected with said member and said units for actuating said units in response to movements of said member, and lost motion connections between said throttle and clutch and their respective auxiliary units to allow normal operation of the vehicle while said units are inactive.

4. In combination with a vehicle internal combustion engine having a throttle valve, clutch and transmission, auxiliary means for adjusting said throttle valve, auxiliary means for engaging and disengaging said clutch, means for operatively engaging and disengaging a driven member with said transmission, a control handle remote from the engine and driver's seat of the vehicle, means operable by movement of said control handle in one direction to operate said clutch and driven member engaging and disengaging means to connect said driven member with the transmission and move said throttle valve toward open position, and means operable by movement of said control handle in an opposite direction to operate said clutch and driven member engaging and disengaging means to disconnect said driven member from the transmission and move said throttle valve toward closed position.

5. In combination with an internal combustion engine having a throttle, clutch and transmission, fluid pressure operated means for engaging and disengaging said clutch, fluid pressure operated means for operatively engaging a driven member with said transmission, fluid pressure operated means for adjusting said throttle, conduits connected with said fluid pressure operated means, valves for controlling the pressures in said conduits, and a control member having one movement controlling said valves to operate said clutch, engage said driven member and partially open said throttle, and having another movement to operate said clutch, disengage said driven member, and close said throttle to idling position.

6. A power transmission control system comprising a fluid pressure operated unit for engaging a driven member with the transmission, a fluid pressure actuated clutch operating unit, a fluid pressure actuated throttle adjusting unit, a solenoid valve controlling said clutch unit, a fluid pressure differential valve controlling said transmission and throttle units, a manual valve controlling said transmission unit and said differential valve, and an operating handle controlling said manual valve and a circuit for said solenoid valve.

7. In combination with an internal combustion engine having a throttle lever, clutch and a transmission, a driven member engageable with said transmission, vacuum operated units for operating said clutch and engaging and disengaging said driven member with the transmission, a vacuum operated unit for moving the throttle lever of the engine between idling position and a running position, conduits connected with said units, a solenoid operated valve connected with said conduits for controlling said clutch unit, a differential pressure operated valve connected with said conduits for controlling the actuation of said throttle and transmission units, a manual valve connected with said differential valve and said transmission unit, and a control handle for adjusting said manual valve and controlling the energization of said solenoid valve.

8. A control system for an internal combustion engine and transmission comprising a vacuum unit for connecting a driven member with said transmission, auxiliary clutch and throttle operating vacuum units, conduits and valve means connected with said units, and a control member for said valve means operable in a first position to connect all of said units with atmospheric pressure, operable in a second position to connect only said clutch unit with a source of vacuum, and operable in a third position to connect only said transmission and throttle units with a source of vacuum.

9. A control system for an internal combustion engine and transmission comprising a vacuum unit for connecting a driven member with said transmission, auxiliary clutch and throttle operating vacuum units, conduits and valve means connected with said units, means for controlling said valve means to connect either said clutch unit or said throttle and transmission units with a source of vacuum, and a restricted orifice for admitting atmospheric pressure to said clutch unit after it has been disconnected from the source of vacuum to effect slow operation of the unit in one direction of its movement.

10. A power transmission control system comprising a fluid pressure operated shifter unit, a fluid pressure actuated clutch operating unit, and a fluid pressure operated throttle adjusting unit, conduit and valve means connected with said clutch and transmission units having differential pressure build-up and release characteristics for controlling the relative speeds of operation of said units in their engaging and disengaging movements, conduit and valve means connected with said throttle unit, and a manipulable control member operably connected with said means and having a range of movement to effect operation of said units in sequence.

11. In a vehicle having an engine and a power take-off, a pneumatic power take-off shifting unit, a pneumatic clutch operating unit, a valve controlling the operation of said shifting unit, a valve controlling the operation of said clutch unit, a remote control valve at a distance from the engine and driver's compartment of the vehicle, and means operable by said remote control valve for actuating said shifting unit and clutch valves.

12. In a vehicle having an engine and a power take-off, a pneumatic power take-off shifting unit, a pneumatic clutch operating unit, a pneumatic throttle adjusting unit, a first valve controlling the operation of said shifting and throttle units, a second valve controlling the operation of said clutch unit, and a remote control valve at a distance from the engine and driver's compartment of the vehicle controlling said first and second valves.

13. In a vehicle having an engine and a power take-off, a pneumatic power take-off shifting unit, a pneumatic clutch operating unit, a pneumatic throttle adjusting unit, a pneumatic relay valve having conduits connected with said shifting unit, said throttle unit and a source of vacuum, a solenoid valve having conduits connected with said clutch unit and a source of vacuum, a control valve having conduits connected with said shifting unit and said pneumatic relay valve, and a switch operable by said control valve controlling said solenoid valve.

References Cited in the file of this patent

UNITED STATES PATENTS

| | | |
|---|---|---|
| 1,805,120 | Von Erhardt | May 12, 1931 |
| 1,887,231 | Coates | Nov. 8, 1932 |
| 1,979,488 | Perez | Nov. 6, 1934 |
| 2,073,692 | Griswold | Mar. 16, 1937 |
| 2,104,061 | Surdy | Jan. 4, 1938 |
| 2,137,953 | Rowley | Nov. 22, 1938 |
| 2,153,509 | Rockwell | Apr. 4, 1939 |
| 2,361,305 | Marmor | Oct. 24, 1944 |